United States Patent [19]

John et al.

[11] Patent Number: 4,865,647

[45] Date of Patent: Sep. 12, 1989

[54] COMPOSITION AND USE

[75] Inventors: Glyn R. John, Lowton; Bernard Tury, Prestwich; Campbell F. Walker, Whitefield, all of England

[73] Assignee: Imperial Chemical Industries PLC, London, England

[21] Appl. No.: 257,121

[22] Filed: Oct. 12, 1988

Related U.S. Application Data

[63] Continuation of Ser. No. 44,832, May 1, 1987, abandoned.

[30] Foreign Application Priority Data

May 14, 1986 [GB] United Kingdom ............... 8611772

[51] Int. Cl.$^4$ ............................................. C04B 9/02
[52] U.S. Cl. .............................. 106/14.15; 106/14.42; 428/457; 427/384
[58] Field of Search ................... 106/14.15, 14.42; 427/384; 428/457

[56] References Cited

U.S. PATENT DOCUMENTS

| | | | |
|---|---|---|---|
| 3,208,945 | 9/1965 | Stuart et al. | 252/51.5 A |
| 3,382,056 | 5/1968 | Mehmedbasich | 44/62 |
| 4,165,292 | 8/1979 | Davis et al. | 252/51.5 |
| 4,233,035 | 11/1980 | Allen et al. | 44/73 |
| 4,256,595 | 3/1981 | Sung et al. | 252/51.5 A |
| 4,326,987 | 4/1982 | Hendricks et al. | 252/51.5 A |
| 4,493,876 | 1/1985 | Birkett et al. | 106/14.15 |
| 4,613,384 | 9/1986 | John | 106/14.15 |

FOREIGN PATENT DOCUMENTS 1055337  1/1967  United Kingdom .

Primary Examiner—Theodore Morris
Attorney, Agent, or Firm—Cushman, Darby & Cushman

[57] ABSTRACT

A composition containing a substituted cyclic anhydride and a hydroxy-oxime. The cyclic anhydride may be a succinic anhydride derivative such as dodecenyl succinic anhydride or a polymer containing cyclic anhydride groups such as polyisobutenyl succinic anhydride. The oxime may be 2-hydroxy-5-nonylbenzaldoxime or 2-hydroxy-5-nonylacetophenone oxime. The composition may be used to inhibit corrosion of metals, particularly iron. The composition may also include further components which are effective to reduce metal corrosion.

20 Claims, No Drawings

COMPOSITION AND USE

This is a continuation of application Ser. No. 044,832, filed May 1, 1987 now abandoned.

This invention relates to a new composition and the use of such a composition to inhibit the corrosion of metals.

In European Patent Application Publication No. 0125025 there is disclosed a process for the inhibition of the corrosion of metals which comprises treating the metal with an optionally substituted 2-hydroxy-5-alkyl-benzaldoxime wherein the 5-alkyl substituent contains from 7 to 13 carbon atoms. The 5-alkyl substituents may be linear or branched, saturated or unsaturated. Branched alkyl groups are especially preferred. As optional substituents X in the benzene ring of the 2-hydroxy-5-alkyl benzaldoxime there are mentioned for example alkyl, aryl, alkoxy and aralkyl groups and more preferably halogen or nitro groups.

In European Patent Application Publication No.0178850 there is disclosed a process for the inhibition of the corrosion of metals which comprises treating the metal with an optionally substituted bis(oximinomethyl)alkylphenol of the following formula:

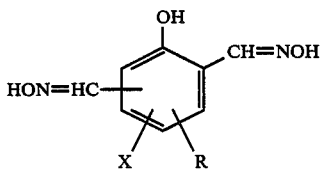

wherein R is an alkyl substituent and X is a substituent both substituents being similar to those present in the benzaldoximes used in the process of European Patent Publication No.0125025. The second oximino group is preferably in the 6 position and hence the preferred compounds in accordance with European Patent Publication No. 0178850 are the optionally substituted 2,6-bis(oximinomethyl)4-alkylphenols.

The processes claimed in the above European Patent Publications using oxime corrosion inhibitors are especially suitable for the corrosion inhibition of iron, zinc, copper, tin and aluminium and in particular mild steel and the zinc surface of galvanised steel.

Both long chain hydrocarbyl ('fatty acids') with the corresponding salts and long chain hydrocarbyl amines with the corresponding salts are well known corrosion inhibitors. Furthermore the products obtained from reaction of the substituted fatty acids or the corresponding anhydrides with amine containing molecules are themselves useful corrosion inhibitors, especially as additives in lubricants and fuels.

In U.S. Pat. No. 4256595 the reaction products from optionally substituted succinic anhydride and 5-aminotriazole are disclosed as being effective corrosion inhibitors for a diesel crankcase lubricant composition.

In U.S. Pat. No. 4326987 the reaction product from alkyl or alkenyl succinic acid or the anhydride thereof and an alkyl ether diamine are found to act as corrosion inhibitors in refined petroleum products such as gasoline, turbine oils, fuel oils, and the like.

In European Patent Application Publication No.0167358, compositions containing a mixture of an alkenyl succinic acid and an aliphatic or cycloaliphatic amine are found to be effective corrosion inhibition additives for use in hydrocarbon fuels and gasohols.

We have now found that a composition providing improved corrosion inhibition can be obtained using a mixture of an oxime compound together with a substituted cyclic anhydride.

According to the present invention, there is provided a composition comprising:

(a) an anhydride of the formula:

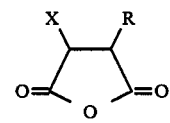

and
(b) a hydroxy-oxime,
wherein:
R is a long chain hydrocarbyl radical which is linear or branched, saturated or unsaturated;
X is hydrogen or an alkyl, aryl, alkoxy or aralkyl group;

or

R and/or X are linked to another cyclic anhydride group which may be the same or different; or
R and X together form a ring system which is substituted with at least one long chain hydrocarbyl radical.

The anhydride is typically one in which X is hydrogen and R is a long chain hydrocarbyl radical. By long chain hydrocarbyl radical is meant a hydrocarbon chain which has a molecular weight of at least 100. Thus, the group R typically contains at least 8 carbon atoms. Thus, the group R can be a linear or branched group such as nonyl, decyl, decenyl, dodecyl, dodecenyl, hexadecyl, octadecyl, octadecenyl and the like. Alternatively, the group R can be derived from a polymeric material.

We have obtained useful results when the anhydride is one in which R is derived from an isobutylene polymer. Thus, preferred anhydrides are succinic anhydrides (X is hydrogen in above formula) where the group R is an isobutylene polymer of molecular weight from about 200 to 8000, especially from 600 to 6000. It is particularly preferred that R is derived from an isobutylene polymer made from butene-1, butene-2 and isobutene. Materials of this type, which contain predominantly isobutylene units, are readily available and are referred to as polyisobutylene succinic anhydride, or PIBSA. Materials of this type are readily obtained, for example by reacting the corresponding isobutylene polymer or a chlorination product thereof, with maleic anhydride. These anhydrides are commercially important as lubricating oil additive intermediates and as oil soluble corrosion inhibitors.

If R and X together form a ring system, the resulting anhydride may, for example, be a long chain substituted derivative of phthalic anhydride.

The corresponding diacids derived from the anhydrides may be present in materials such as polyisobutylene succinic anhydride and consequently in the compositions in accordance with the present invention may also include these diacids, which typically result from hydrolysis of the anhydride.

The hydroxy-oxime which is component (b) of the composition in accordance with the present invention contains the moiety

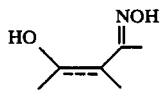

More specifically, the hydroxy-oxime is a compound of the general formula:

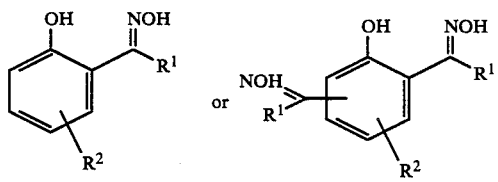

where
R$^1$ is a hydrogen atom or a substituted or unsubstituted hydrocarbon group; and
R$^2$ is a substituted or unsubstituted hydrocarbon group in which the hydrocarbon group contains from 5 to 22 carbon atoms.

The group R$^1$ is preferably a hydrogen atom but may be an alkyl, aryl or benzyl group, for example a methyl group. In the bis-oxime compound, the second oxime group is preferably in the 6-position and particularly preferred compounds of this type are the 2,6-bis(oximinomethyl)-4-alkylphenols.

The group R$^2$ is preferably an alkyl group containing from 5 to 14 carbon atoms. The preferred mono-oximes are 2-hydroxy-5-alkylbenzaldoximes.

The group R$^2$ may be a linear or branched, saturated or unsaturated group. Compounds in which R$^2$ is a branched alkyl group are particularly preferred. Suitable compounds of this type include 2-hydroxy-5-nonylbenzaldoxime and 2-hydroxy-5-dodecylbenzaldoxime. Compounds in which the group R$^1$ is a hydrocarbon group are the ketoximes such as, for example 2-hydroxy-5-nonyl acetophenone oxime.

The weight ratio of the anhydride or mixture thereof with the corresponding diacid, to the hydroxy-oxime may be between 99:1 to 1:99 but will generally be from 10:1 to 1:10, particularly from 5:1 to 1:5. However, the preferred proportions will be dependent on the particular compounds present in the mixture.

The composition of the invention may also include other materials, particularly materials which also provide corrosion inhibiting properties. Such corrosion inhibiting materials include, for example, petroleum sulphonates, aryl sulphonates and the metal salts thereof. The composition may additionally, or alternatively, include materials such as oils, greases and waxes.

The other materials may be present in the composition in a substantial proportion of up to several times, for example up to ten times, by weight of the mixture of the anhydride and the hydroxy-oxime. In general no particular advantage is achieved by using a large excess of the other materials and preferably the proportion of the other materials do not exceed twice the weight of the mixture and conveniently the other materials are present in essentially an equal proportion by weight relative to the weight of the mixture.

As noted previously herein, the compositions of the present invention provide improved corrosion inhibition.

Thus, as a further aspect of the present invention, there is provided a process which comprises treating at least part of the surface of a metal with a composition comprising:
(a) an anhydride as hereinbefore defined, and
(b) a hydroxy-oxime.

The anhydride and hydroxy-oxime which are present in the composition are as described in more detail previously herein.

We have found that the composition provides a corrosion inhibiting properties and, in particular, many mixtures exhibit corrosion inhibiting properties in excess of either of the individual components.

The process of the present invention is especially suitable for the corrosion inhibition of iron, zinc, copper, tin and aluminium and in particular mild steel and the zinc surface of galvanised steel.

The metal may be treated directly with the composition, although it is generally preferred to apply the composition to the metal surface in the form of a solution in a suitable organic solvent or as an aqueous emulsion of the composition or as an aqueous emulsion of a solution of the composition in an organic solvent. The composition may be used to provide a protective coating in its own right, or as a metal pre-treatment before the application of a surface coating, or may be incorporated into a surface coating composition, or may be employed as an additive to petroleum refined products such as lubricating oils, turbine oils, fuel oils and gasohols or greases.

Conventional organic solvents may be used for the composition, and include for example aliphatic and aromatic hydrocarbons, and halogenated, particularly chlorinated, hydrocarbon solvents, ethers and ketones. Especially preferred solvents are those having good wetting and drying properties and include for example benzene, toluene, xylene, kerosene, white spirit, chloroform, and 1,1,1-trichloroethane.

Aqueous emulsions of the composition may be formed in conventional manner using conventional dispersants and surfactants, including non-ionic dispersants. It may be convenient to treat the metal with an aqueous emulsion of the composition, particularly if the anhydride present in the composition is a liquid which can be formed directly into an emulsion.

The process of the present invention may provide corrosion inhibition either without the application of a further surface coating or as a pre-treatment before the application of a further surface coating. Thus the treatment may be used for example as a temporary protection whilst the metal is being transferred from one site to another. Thus the process of the present invention may be used for the temporary protection of a metal surface and the protective coating subsequently dissolved before or during further processing.

Alternatively, the composition may be formulated in a surface coating composition, for example a paint (primer) such as an air-drying, oil-modified system or a system including a chlorinated rubber, lacquer, resin or other protective coating. The surface coating may be a solvent-based composition, for example a cellulose/solvent based primer paint such as those used for car "touch up" paints. The components of the composition are soluble in solvents generally used for such primers (for example nitrocellulose) and may be incorporated directly. The composition may also be used as an emulsion in aqueous emulsion surface coating systems, for example primers or protective coatings based on polymer latices such as for example acrylic and styrene/acrylic latices and vinyl acrylic co-polymer latices including acrylate modified vinyl chloride -vinylidene chloride copolymer latices. The composition may also for example be incorporated in temporary alkali-removable protective coatings (whether solvent-based or emulsion based) of the addition polymer type in which the polymer contains carboxyl groups.

The composition or the solution or emulsion thereof may be applied to the metal in conventional manner, for example by dipping, spraying or brushing. The temperature of the application may be from 0° to 50° C. Typically, solutions of the composition may contain from 0.1 to 20% by weight of the mixture of the anhydride and the hydroxy-oxime, whilst emulsions preferably contain from 0.1 to 5% by weight of the mixture of anhydride and hydroxy-oxime. The presence of from 0.1 to 2% by weight of the mixture of anhydride and hydroxy-oxime in a surface coating emulsion formulation is generally sufficient to provide improved corrosion inhibition. If the composition contains materials in addition to the anhydride and the hydroxy-oxime, the amount of the composition which is used should be sufficient to provide the mixture of the anhydride and the hydroxy-oxime in the proportions as set out herein.

The metal to be treated may be brightly polished and/or freshly cleaned, but it is an advantageous feature of the process of the present invention that effective corrosion inhibition may be obtained even on a lightly rusted surface. Indeed we have found that better results are in general achieved when a surface is treated in an "as received" condition than when that same surface is freshly cleaned or brightly polished.

Various aspects of the present invention are set out in the following illustrative examples in which all parts and percentages are by weight unless otherwise stated and all concentrations are on a wt/wt basis.

EXAMPLES 1 TO 3

Bright mild steel 1 inch×1 inch (25.4 mm×25.4 mm) coupons of average weight 7.5 g were thoroughly washed with acetone followed by ethanol and stored in kerosene until required. Immediately prior to use the coupons were washed with acetone. Test coupons prepared as above were immersed for about two minutes in 10% w/w solutions, in 1,1,1-trichloroethane, of 2-hydroxy-5-nonylbenzaldoxime, or of a polyisobutenyl succinic anhydride of approximate molecular weight 1100 or a mixture of both materials, in the proportions set out in Table 1. After immersion in the 1,1,1-trichloroethane solutions for about two minutes, the steel coupons were dried in air and then transferred to a 3% aqueous salt solution at ambient temperature. After 5 days immersion the coupons were removed, washed and the weight losses due to corrosion were determined. The results are given in Table 1.

TABLE 1

| Example or Comp. Ex. | Additive (a) | Weight loss (%) |
| --- | --- | --- |
| A | 10% BAO | 0.063 |
| 1 | 7.5% BAO + 2.5% PIBSA | 0.023 |
| 2 | 5% BAO + 5% PIBSA | 0.033 |
| 3 | 2.5% BAO + 7.5% PIBSA | 0.044 |
| B | 10% PIBSA | 0.062 |
| C | Untreated | 0.178 |

Notes to Table 1
(a) BAO is 2-hydroxy-5-nonylbenzaldoxime.
PIBSA is polyisobutenyl succinic anhydride of approximate molecular weight 1100.
Untreated means that the coupon was clean but was not subjected to any further treatment.

EXAMPLES 4 TO 6

The procedure of Examples 1 to 3 was repeated but using 5% solutions as indicated below. The corrosion test was effected by placing the coupons in distilled water at ambient temperature. After immersion in the distilled water for 28 days, the coupons were removed, washed and the weight losses due to corrosion were determined. The results are given in Table 2.

TABLE 2

| Example or Comp. Ex. | Additive (a) | Weight loss (%) |
| --- | --- | --- |
| D | 5% BAO | 0.051 |
| 4 | 3.75% BAO + 1.25% PIBSA | 0.025 |
| 5 | 2.5% BAO + 2.5% PIBSA | 0.022 |
| 6 | 1.25% BAO + 3.75% PIBSA | 0.014 |
| E | 5% PIBSA | 0.048 |
| F | Untreated | 0.877 |

Notes to Table 2
(a) is as defined in Notes to Table 1.

EXAMPLE 7

2-hydroxy-5-nonylbenzaldoxime, or the anhydride of Comparative Example B, or a 50:50 mixture of the two materials were added to mineral oil at a level of 1% w/w additive (total). Bright mild steel coupons were immersed in the resulting composition for about 10 minutes, removed and allowed to drain for about 18 hours. The treated coupons were then immersed in distilled water at ambient temperature. After 7 days the coupons were removed, washed and the weight losses were determined. The results are given in Table 3.

TABLE 3

| Example or Comp.Ex. | Additive (a) (b) | Weight loss (%) |
| --- | --- | --- |
| G | BAO | 0.145 |
| 7 | BAO + PIBSA (50:50) | 0.018 |
| H | PIBSA | 0.084 |
| I | Untreated | 0.164 |

Notes to Table 3
(a) is as defined in Notes to Table 1.
(b) All additions were effected to give 1% w/w of total additive or additive mixture in mineral oil.

EXAMPLE 8

An oil/water corrosion test was carried out based on ASTM D665 but modified as set out hereafter. The method involved suspending a bright, clean pre-weighed mild steel coupon (prepared as in Examples 1 to 3) in a mixture of 100cm³ mineral oil and 10cm³ 3% w/w aqueous sodium chloride solution containing test inhibitor, which mixture was being stirred at about 1000 rpm. The mixture was stirred at 60° C. for 5.5. hours after which the coupon was removed, washed and the weight loss determined. Each test was done in triplicate. The additive used and weight loss due to corrosion are set out below in Table 4.

TABLE 4

| Example or Comp.Ex. | Additive (a) (c) | Weight loss (mg) | | |
| --- | --- | --- | --- | --- |
| J | DDSA | 9.1, | 4.3, | 6.5 |
| K | BAO | 6.2, | 6.6, | 6.4 |
| 8 | 3 DDSA:1 BAO | 1.2, | 1.3, | 1.3 |

TABLE 4-continued

| Example or Comp.Ex. | Additive (a) (c) | Weight loss (mg) |
| --- | --- | --- |
| L | Nil | 37.4, 28.4, 48.0 |

Notes to Table 4
(a) is as defined in Notes to Table 1.
(c) All additives, and mixtures of additives, were used in an amount of 0.1 g. DDSA is dodecenyl succinic anhydride.
Nil indicates that the test solution did not contain an additive.

EXAMPLES 9 TO 11

The procedure of Examples 1 to 3 was repeated except that 2-hydroxy-5-nonylbenzaldoxime was replaced by 2-hydroxy-5-nonylacetophenone oxime, which was available as a 50% w/w solution in a kerosene type solvent. The results obtained are set out in Table 5.

TABLE 5

| Example or Comp.Ex. | Additive (a) (d) | Weight loss (%) |
| --- | --- | --- |
| M | 10% HNAO | 0.101 |
| 9 | 7.5% HNAO + 2.5% PIBSA | 0.009 |
| 10 | 5% HNAO + 5% PIBSA | 0.013 |
| 11 | 2.5% HNAO + 7.5% PIBSA | 0.027 |
| N | 10% PIBSA | 0.055 |
| O | Untreated | 0.178 |

Notes to Table 5
(a) is as defined in Notes to Table 1.
(d) HNAO is 2-hydroxy-5-nonylacetophenone oxime, and proportions expressed as the proportion of the ketoxime which was used.

EXAMPLE 12

A 3% w/w solution of 100 Solvent Neutral Base Oil (obtained from Burmah Castrol) in white spirit (a solvent containing predominantly aliphatic hydrocarbons and having a boiling point range of from 150° C. up to 200° C.) was prepared and to this oil solution was added 1% w/w of additive. A cold-rolled mild steel panel (75×100 mm) which was used in the as received condition without special pre-treatment, was coated by immersion in the test solution. The coated panel was allowed to dry for several hours and was then subjected to salt spray testing according to ASTM Test Method B117 (1973).

After twenty four hours continuous exposure, the panels were removed and carefully assessed. Additives used and percent areas rusted are set out in Table 6.

TABLE 6

| Example or Comp.Ex. | Additive (a)(e) | % Area of panel covered by rust |
| --- | --- | --- |
| P | BAO | 90 |
| Q | PIBSA | 25 |
| 12 | BAO + PIBSA (1:3) | 5 |
| R | Nil | 90 |

Notes to Table 6
(a) is as defined in Notes to Table 1.
(e) All additives, and mixtures of additives, were used in an amount of 1% w/w in the treatment solution.
Nil indicates that the treatment solution did not contain an additive.

EXAMPLE 13

Mild steel coupons, as described and pre-treatment in Examples 1 to 3, were immersed in solutions of mixtures of additives in white spirit. Following removal from the treatment solution and allowing the coupons to air-dry for about 18 hours, they were transferred to a 3% w/w aqueous salt solution at ambient temperature. After five days immersion in the salt solution the coupons were removed, cleaned and the weight losses, due to corrosion, determined. The mixtures of additives used, the coating weights and the percentage protection obtained are given in Table 7.

TABLE 7

| | Example or Comparative Example | | |
| --- | --- | --- | --- |
| | S | 13 | T |
| % BAO (a)(f) | 15 | 2.5 | Nil |
| % PIBSA (a)(f) | Nil | 12.5 | 15 |
| % L (f)(h) | 15 | 15 | 15 |
| Coating wt.(g · m$^{-2}$) (i) | 3.7 | 3.6 | 3.5 |
| % Protection (j) | 77 | 90 | 80 |

Notes to Table 7
(a) is as defined in Notes to Table 1.
(f) % is the % w/w of each additive dissolved in the treatment solution.
(h) L is a commercial grade of lanolin obtained from Westbrook Lanolin Company, Bradford, England.
(i) Coating weight is determined by weighing the coupon before and after coating and dividing the weight difference (in g) by the surface area of the coupon (in m$^2$).
(j) % protection is determined from the difference between the weight loss of an untreated coupon subjected to the same test and the weight loss of the test coupon, the difference being expressed as a percentage of the weight loss of the untreated coupon.

EXAMPLES 14–15

Bright, clean, pre-weighed mild steel coupons (prepared as in Examples 1 to 3) were immersed in 10% solutions of additives in 500 Solvent Neutral Base Oil (obtained from Burmah Castrol). The coated coupons were allowed to drain for about 18 hours and then transferred to 3% aqueous salt solution at ambient temperature. After five days immersion in the salt solution, the coupons were removed, cleaned and the weight losses, due to corrosion, determined. The additives used, the coating weights and the weight losses obtained are given in Table 8.

TABLE 8

| Ex. or Comp. Ex | Additive (a)(k) | Coating weight (g · m$^2$) | Weight loss (mg) |
| --- | --- | --- | --- |
| U | BAO | 6.0 | 11.7 |
| 14 | BAO + PIBSA (1:3) | 5.7 | 2.2 |
| V | BNSA | 5.4 | 10.3 |
| 15 | BAO + PIBSA + BNSA (1:3:4) | 5.3 | 4.2 |
| W | Untreated | — | 11.2 |

Notes to Table 8
(a) is as defined in Notes to Table 1.
(k) BNSA is the barium salt of di(nonyl)naphthalene sulphonic acid. All additions were effected to give 10% w/w of total additive or additive mixture in the mineral oil.

We claim:
1. A composition suitable for use in inhibiting metal corrosion comprising
   (a) an anhydride of the formula:

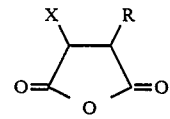

and
   (b) a hydroxy-oxime which contains the moiety,

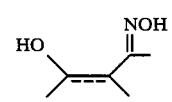

wherein:

R is a long chain hydrocarbyl radical which is linear or branched, saturated or unsaturated and has a molecular weight of at least 100;

X is hydrogen or an alkyl, aryl, alkoxy, or aralkyl group;

or

R and/or X are linked to another cyclic anhydride group which is the same or different; or R and X together form a ring system which is substituted with at least one long chain hydrocarbyl radical, the corrosion inhibiting effect of (a) and (b) together being greater than the effect of an equivalent amount of (a) or (b) used separately said composition contains from 1 to 99 parts by weight of (a) and 99 to 1 parts by weight of (b).

2. The composition of claim 1 wherein the anhydride is one in which R is derived from an isobutylene polymer.

3. The composition of claim 2 wherein the anhydride is one in which R is an isobutylene made from butene-1, butene-2 and isobutene and having a molecular weight from about 200 to 8000.

4. The composition of claim 1 wherein the anhydride is one in which X is hydrogen and R is nonyl, decyl, decenyl, dodecyl, dodecenyl, hexadecyl, octadecyl, octadecenyl or is derived from a polymeric material.

5. The composition of claim 4 wherein the hydroxy-oxime is of the general formula:

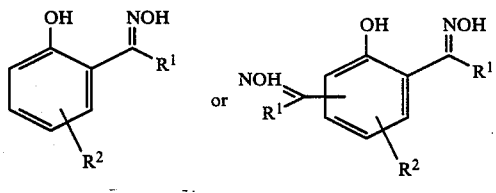

where $R^1$ is a hydrogen atom or a substituted or unsubstituted hydrocarbon group; and $R^2$ is a substituted or unsubstituted hydrocarbon group in which the hydrocarbon group contains from 5 to 22 carbon atoms.

6. The composition of claim 1 wherein the hydroxy-oxime is a mono-oxime which is a 2-hydroxy-5-alkylbenzaldoxime or a 2-hydroxy-5-alkylbenzoketoxime.

7. The composition of claim 6 wherein the hydroxy-oxime is 2-hydroxy-5-nonylbenzaldoxime.

8. The composition of claim 1 which also includes at least one further material which provides corrosion inhibiting properties.

9. The process which comprises treating at least part of the surface of a metal with the composition of claim 1.

10. The process of claim 9 wherein the composition is applied to the metal surface as a solution in an organic solvent, as an aqueous emulsion or as an aqueous emulsion of a solution of the composition in an organic solvent.

11. The process of claim 9 wherein the composition is applied to the metal surface in a surface coating composition.

12. A metal at least part of one surface of which has been coated with the composition of claim 1.

13. The composition of claim 5 wherein the weight ratio of anhydride to hydroxy-oxime is from 10:1 to 1:10, the anhydride is a polyisobutenyl succinic anhydride and the hydroxy-oxime is 2-hydroxy-5-nonylbenzaldoxime.

14. A composition comprising:

(a) an anhydride of the formula:

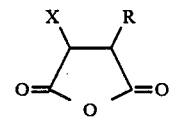

and (b) a hydroxy-oxime which contains the moiety,

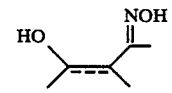

wherein:

R is a long chain hydrocarbyl radical which is linear or branched, saturated or unsaturated and has a molecular weight of at least 100;

X is hydrogen; and the weight ratio of (a) to (b) is from 10:1 to 1:10.

15. A composition comprising:

(a) an anhydride of the formula:

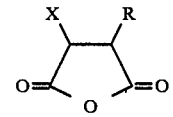

and (b) a hydroxy-oxime of the general formula:

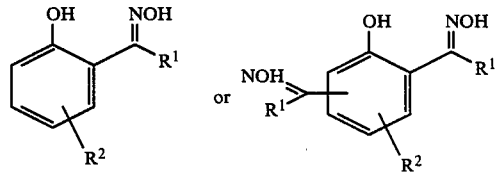

wherein

R is a long chain hydrocarbyl radical which is linear or branched, saturated or unsaturated and has a molecular weight of at least 100;

X is hydrogen;

$R^1$ is a hydrogen atom or a substituted or unsubstituted hydrocarbon group;

$R^2$ is a substituted or unsubstituted hydrocarbon group in which the hydrocarbon group contains from 5 to 22 carbon atoms; and the weight ratio of (a) to (b) is from 10:1 to 1:10.

16. The composition of claim 15 wherein (b) is a hydroxy-oxime of the general formula:

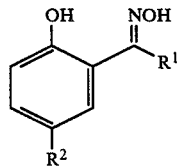

wherein $R^1$ is hydrogen or methyl; and
$R^2$ is an unsubstituted hydrocarbon group which contains from 5 to 22 carbon atoms.

17. A composition comprising:
(a) polyisobutylene succinic anhydride or dodecenyl succinic anhydride; and
(b) 2-hydroxy-5-nonylbenzaldoxime or 2-hydroxy-5-nonylacetophenone oxime; and
the weight ratio of (a) to (b) is from 10:1 to 1:10.

18. The composition of claim 1 wherein the anhydride is one in which X is hydrogen and R is derived from a polymeric material.

19. The composition of claim 13, wherein the ratio is from 5:1 to 1:5.

20. The composition of claim 17, wherein the ratio is from 5:1 to 1:5.

* * * * *